US012802303B2

(12) United States Patent
Wampler et al.

(10) Patent No.: US 12,802,303 B2
(45) Date of Patent: Nov. 17, 2026

(54) FITTING CURVES TO REGION BOUNDARIES OF A DIGITAL IMAGE UTILIZING PATH SIMPLIFICATION FOR POLYLINES

(71) Applicant: Adobe Inc., San Jose, CA (US)

(72) Inventors: Kevin Wampler, Seattle, WA (US); Vishwas Jain, Bangalore (IN); Jaswant Singh Ranawat, Chittorgarh (IN); Ankit Phogat, Noida (IN); Vineet Batra, Pitam Pura (IN)

(73) Assignee: Adobe Inc., San Jose, CA (US)

( * ) Notice: Subject to any disclaimer, the term of this patent is extended or adjusted under 35 U.S.C. 154(b) by 254 days.

(21) Appl. No.: 18/765,647

(22) Filed: Jul. 8, 2024

(65) Prior Publication Data

US 2026/0011052 A1 Jan. 8, 2026

(51) Int. Cl.

| | |
|---|---|
| ***G06T 11/23*** | (2026.01) |
| ***G06T 7/11*** | (2017.01) |
| ***G06T 7/12*** | (2017.01) |
| ***G06T 7/162*** | (2017.01) |
| ***G06T 7/181*** | (2017.01) |
| ***G06T 7/50*** | (2017.01) |
| ***G06T 11/26*** | (2026.01) |

(52) U.S. Cl.

CPC ................ *G06T 11/23* (2026.01); *G06T 7/11* (2017.01); *G06T 7/12* (2017.01); *G06T 7/162* (2017.01); *G06T 7/181* (2017.01); *G06T 7/50* (2017.01); *G06T 11/26* (2026.01)

(58) Field of Classification Search

None

See application file for complete search history.

(56) References Cited

U.S. PATENT DOCUMENTS

| | | | | |
|---|---|---|---|---|
| 11,698,788 B2 * | 7/2023 | Batra | .................. | G06F 9/30036 345/440 |
| 2020/0210540 A1 * | 7/2020 | Bala | ..................... | A45D 44/002 |

OTHER PUBLICATIONS

Ilya Baran, Jaakko Lehtinen, and Jovan Popovic "Sketching Clothoid Splines Using Shortest Paths". The Eurographics Association and Blackwell Publishing Ltd, 15 pages, 2010.

Johannes Kopf and Dani Lischinski. "Depixeling Pixel Art". 8 pages, [online] 2011 [retrieved on Aug. 28, 2024]. Retrieved from the Internet: <URL: https://johanneskopfde/publications/pixelart/>.

(Continued)

*Primary Examiner* — Michael J Cobb

(74) *Attorney, Agent, or Firm* — Keller Preece PLLC

(57) ABSTRACT

Methods, systems, and non-transitory computer readable storage media are disclosed for vectorizing raster images using path simplification via corner detection and a directed graph. The disclosed system determines a plurality of line segments from one or more paths along boundaries of segmented regions of a raster image. The disclosed system determines cornerness scores corresponding to portions of the one or more paths at a set of vertices by comparing the portions at the set of vertices to different shapes including at least a corner shape. The disclosed system also fits a plurality of candidate vector paths to input paths corresponding to pairs of the set of vertices. Additionally, the disclosed system generates a vector image comprising a set of vector paths fitted to the boundaries of the segmented regions that minimize costs according to the cornerness scores.

20 Claims, 13 Drawing Sheets

(56) References Cited

OTHER PUBLICATIONS

Maureen C. Stone and Tony D. DeRose. "A Geometric Characterization of Parametric Cubic Curves". ACM Transactions on Graphics., 8(3):147-163, Jul. 1989.
Philip J. Schneider. "An Algorithm for Automatically Fitting Digitized Curves". Academic Press Professional, Inc., USA, pp. 612-626, 1990.

* cited by examiner

FITTING CURVES TO REGION BOUNDARIES OF A DIGITAL IMAGE UTILIZING PATH SIMPLIFICATION FOR POLYLINES

BACKGROUND

Many image editing tasks involve segmentation and vectorization of raster images for additional downstream operations. For example, some segmentation tasks involve converting raster images to vector images for use in various digital graphics environments. Specifically, vector-based graphics provide lossless scaling of images, which is particularly useful in various image editing tasks or for using a single digital image file for multiple different sizes and use cases (e.g., for reproducing digital images in physical prints). Accordingly, being able to accurately and efficiently generate a vector image from a segmentation of a raster image with lossless scaling attributes is an important aspect of many image editing operations. Due to the complexity of many raster images, conventional image systems that vectorize the raster images often struggle to balance efficiency and accuracy while frequently producing vector images that are not easily editable in many workflows.

SUMMARY

One or more embodiments provide benefits and/or solve one or more of the foregoing or other problems in the art with systems, methods, and non-transitory computer readable storage media for vectorizing raster images using path simplification via corner detection and a directed graph. In particular, the disclosed systems determine line segments with a set of vertices based on one or more paths (e.g., a set of polylines) along boundaries of segmented regions a raster image. The disclosed systems generate cornerness scores for the set of vertices indicating the likelihood of each vertex becoming a corner vertex in a final vector geometry by fitting one or more shapes (e.g., an arc or a straight line) at the vertex. Additionally, the disclosed systems fit one or more candidate vector paths to each vertex pair of the set of vertices. The disclosed systems generate a directed graph that includes the line segments and candidate vector paths as nodes with edges representing the set of vertices according to the relationships of the line segments/candidate vector paths to the set of vertices. Furthermore, the disclosed systems utilize the directed graph to generate a vector image by selecting line segments and/or candidate vector paths for reconstructing the boundaries of the segmented regions that minimize costs according to the cornerness scores. The disclosed systems thus provide accurate and efficient vectorization of a raster image with simplified paths for improved usability in a graphical user interface.

BRIEF DESCRIPTION OF THE DRAWINGS

Various embodiments will be described and explained with additional specificity and detail through the use of the accompanying drawings.

DETAILED DESCRIPTION

Figure 1:
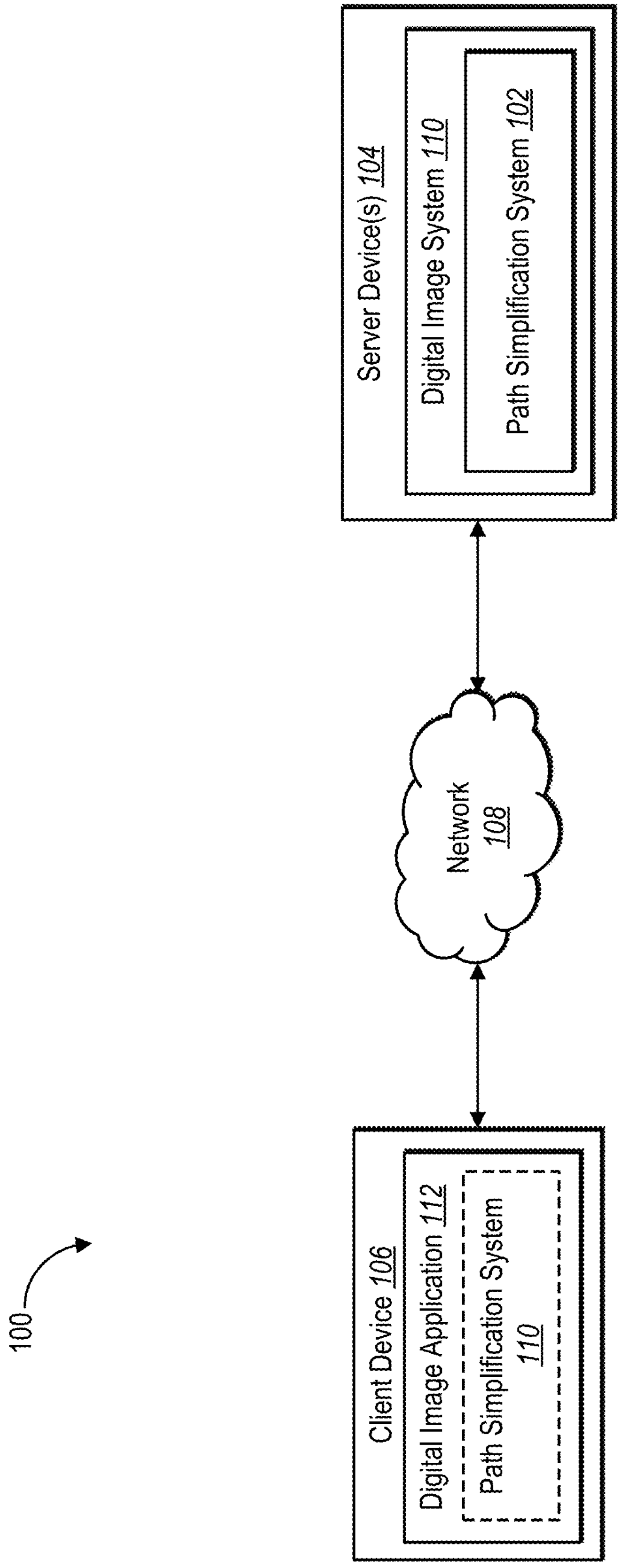
FIG. 1 illustrates an example system environment in which a path simplification system operates in accordance with one or more implementations.

One or more embodiments of the present disclosure include a path simplification system that vectorizes digital images via path simplification. In particular, the path simplification system determines a plurality of line segments connected via a set of vertices along boundaries of segmented regions of a raster image. Additionally, the path simplification system generates cornerness scores for the set of vertices to detect likely corners formed by path portions in relation to the set of vertices. Furthermore, the path simplification system fits one or more candidate vector paths (e.g., candidate cubic Bezier curves) to each vertex pair in the set of vertices and generates a directed graph that connects the candidate vector paths and/or line segments to corresponding vertices via a plurality of nodes and edges. The path simplification system generates a vector image by traversing the directed graph to select candidate vector paths and/or line segments that minimize associated costs according to the cornerness scores of the set of vertices.

In some embodiments, the path simplification system determines paths along boundaries of segmented regions of a raster image. For example, the path simplification system determines polylines generated to represent the boundaries of segmented regions (e.g., segmented according to color values) with indications of junction nodes in relation to the segmented regions. The path simplification system determines extended sub-paths based on the junction nodes and the polylines.

In one or more embodiments, the path simplification system performs path simplification operations to generate line segments connected by a set of vertices to represent the paths formed from the polylines. Specifically, the path simplification system utilizes an iterative end-point fit algorithm to reduce a number of points along the boundaries of the segmented regions by determining line segments connected by the set of vertices to fit the extended sub-paths. Furthermore, the path simplification system uses portions of the paths and set of vertices to perform automatic corner detection using cornerness scores for each of the vertices, such as by comparing the shapes formed by connected path portions to different shapes (e.g., a corner shape, an arc shape, a straight line shape). In one or more embodiments, the path simplification system also fits one or more candidate vector paths to each pair of vertices in the set of vertices based on tangent vectors of the set of vertices.

In additional embodiments, the path simplification system generates a vector image from the line segments and/or candidate vector paths. In particular, the path simplification system generates a directed graph that includes nodes representing the line segments and the candidate vector paths. The path simplification system generates the directed graph to include edges between the nodes to represent vertices of the set of vertices that correspond to the line segments or candidate vector paths. The path simplification system determines costs associated with the line segments, candidate path vectors, and vertices (e.g., based on corresponding cornerness scores) and uses the directed graph to generate one or more paths that minimize the costs.

Conventional systems that provide raster image vectorization typically use inefficient methods of curve fitting for segmented raster images. Specifically, some conventional systems directly convert image segmentations of raster images to vector paths (e.g., by using the image segmentations as direct input to a vectorization operation). Although such conventional systems sometimes recreate detected edges/boundaries of raster images in vector images with acceptable accuracy, the resulting vector images are often overly complex. For example, raster images with high levels of fine detail generally have complex image segmentations. Thus, converting the complex detail directly to vector paths causes many unnecessary curves and points which results in larger image files and slower loading/transmission times, limiting usability of the vector images for web-based image editing applications and downstream operations.

Furthermore, the conventional systems that use such methods to convert raster images to vector paths directly from image segmentations also result in unwieldy interactivity in image editing interfaces. More specifically, vector images that have many vector paths and/or points make it difficult for users to interact with individual components due to the density of information displayed in graphical user interfaces, screen sizes/resolutions, or other device or application limitations. Additionally, large numbers of interaction points in a vector image often make it difficult to modify a portion of the vector image in an intended way or without many interactions via a graphical user interface.

The path simplification system provides a number of advantages in computing systems that vectorize raster images. For example, the path simplification system provides accurate vectorization with improved interactivity in graphical user interfaces. In contrast to conventional systems that generate overly complex vector images, the path simplification system generates user friendly vector images with simplified paths that represent boundaries of segmented regions of raster images. In particular, by using path simplification with corner detection to select line segments and/or candidate vector paths in connection with a set of vertices, the path simplification system generates vector images that have a reduced set of paths and vertices relative to conventional systems.

Additionally, by simplifying paths that represent segmented regions of a raster image in connection with vectorizing a digital image provides improved efficiency over conventional systems. In contrast to conventional systems that generate complex vector files, and thus inefficient vector image files, the path simplification system provides simplified vector images that accurately represent the content of raster images. For example, by reducing the number of paths and vertices during vectorization of a raster image, the path simplification system also reduces the vector image file sizes and complexity. Thus, the path simplification system also provides improved storage and transmission efficiency for the vector image files while also improving the usability of the vector image files in downstream operations.

Turning now to the figures, FIG. 1 includes an embodiment of a system environment 100 in which a path simplification system 102 is implemented. In particular, the system environment 100 includes server device(s) 104 and a client device 106 in communication via a network 108. Moreover, as shown, the server device(s) 104 include a digital image system 110, which includes the path simplification system 102. Furthermore, the client device 106 includes a digital image application 112, which optionally includes the path simplification system 102 (or the digital image system 110).

As shown in FIG. 1, the client device 106 or the server device(s) 104 include or host the digital image system 110. The digital image system 110 includes, or is part of, one or more systems that implement digital image generation or editing operations. For example, the digital image system 110 provides tools for generating or editing digital images (e.g., raster images storing visual information as pixels). To illustrate, the digital image system 110 communicates with the client device 106 via the network 108 to provide the tools for display and interaction via the digital image application 112 at the client device 106. Additionally, in some embodiments, the digital image system 110 receives requests to access digital image data stored (e.g., at the server device(s) 104 or at another device such as a database) and/or requests to store digital image data. In some embodiments, the digital image system 110 receives interaction data for viewing or performing various image processing operations and provides the results of the interaction data (e.g., generated digital image data) for display via the digital image application 112 or to a third-party system.

According to one or more embodiments, the digital image system 110 utilizes the path simplification system 102 to vectorize raster images. In particular, the path simplification system 102 utilizes path simplification to generate paths including a combination of line segments and/or candidate vector paths with a set of vertices to reconstruct vector images from raster images. Specifically, the path simplification system 102 determines line segments and a set of vertices that represent boundaries of segmented regions of a raster image. Additionally, the path simplification system 102 generates candidate vector paths to represent paths corresponding to the boundaries of the segmented regions. The path simplification system 102 also generates a directed graph including the line segments, candidate vector paths, and set of vertices for determining paths that minimize costs in the resulting vector image. In one or more embodiments, the digital image system 110 utilizes the vector image for one or more downstream operations (e.g., via the digital image application 112 of the client device 106).

As illustrated in FIG. 1, the path simplification system 102 is implemented on the client device 106 or on the server device(s) 104. In particular, in some implementations, the path simplification system 102 on the server device(s) 104 supports the path simplification system 102 on the client device 106. For instance, the server device(s) 104 generates or obtains the path simplification system 102 for the client device 106 (e.g., as part of a software application or suite). The server device(s) 104 provides the path simplification system 102 to the client device 106 for performing digital image editing processes at the client device 106. In other words, the client device 106 obtains (e.g., downloads) the path simplification system 102 from the server device(s) 104. At this point, the client device 106 is able to utilize the path simplification system 102 to edit digital images independently from the server device(s) 104.

In additional embodiments, although FIG. 1 illustrates the server device(s) 104 and the client device 106 communicating via the network 108, the various components of the system environment 100 communicate and/or interact via other methods (e.g., the server device(s) 104 and the client device 106 communicate directly). Furthermore, although FIG. 1 illustrates the path simplification system 102 being implemented by a particular component and/or device within the system environment 100, the path simplification system 102 is implemented, in whole or in part, by other computing devices and/or components in the system environment 100. For example, in some embodiments, the server device(s) 104 include or host the digital image system 110 and/or the path simplification system 102.

To illustrate, the path simplification system 102 includes a web hosting application that allows the client device 106 to interact with content and services hosted on the server device(s) 104 (e.g., in a software as a service implementation). To illustrate, in one or more implementations, the client device 106 accesses a web page supported by the server device(s) 104. The client device 106 provides input to the server device(s) 104 to view information for vectorization tasks and, in response, the path simplification system 102 or the digital image system 110 on the server device(s) 104 performs operations to segment raster images. The server device(s) 104 provide the output or results of the operations to the client device 106.

In one or more embodiments, the server device(s) 104 include a variety of computing devices, including those described below with reference to FIG. 13. For example, the server device(s) 104 include one or more servers for storing and processing data associated with image editing processes. In some embodiments, the server device(s) 104 also include a plurality of computing devices in communication with each other, such as in a distributed storage environment. In some embodiments, the server device(s) 104 include a content server. The server device(s) 104 also optionally include an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 13). Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, generating, and editing digital images. In some embodiments, the client device 106 also performs functions for generating, capturing, or accessing data to provide to the digital image system 110 and the path simplification system 102 in connection with editing digital images. For example, the client device 106 communicates with the server device(s) 104 via the network 108 to provide information (e.g., user interactions) associated with digital images. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 13.

Figure 2:
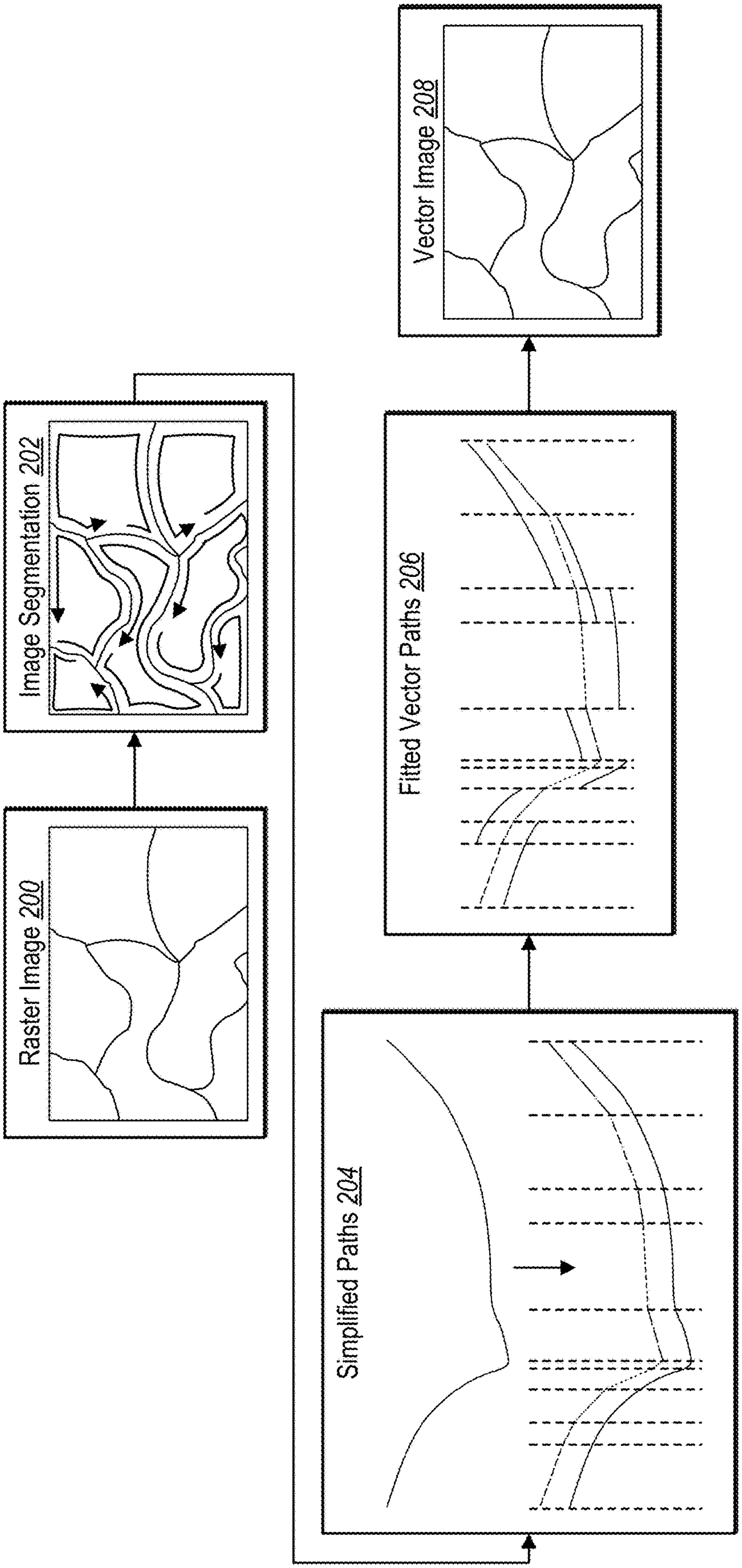
FIG. 2 illustrates a diagram of an overview of the path simplification system vectorizing a digital image via path simplification and vector path fitting in accordance with one or more implementations.

As mentioned, the path simplification system 102 vectorizes raster images by generating simplified paths with line segments and/or candidate vector paths with a set of vertices. FIG. 2 illustrates an overview diagram of the path simplification system 102 vectorizing a raster image via path simplification. Specifically, FIG. 2 illustrates simplifying and fitting vector paths to a set of paths corresponding to boundaries of segmented regions of a raster image.

In one or more embodiments, as illustrated in FIG. 2, the path simplification system 102 determines a raster image 200 in connection with one or more image editing tasks. Specifically, the raster image 200 includes visual information stored as a plurality of pixels with pixel values indicating color (or other visual information) in a particular color space. For example, the raster image 200 includes a plurality of rows and columns of pixels based on a resolution of the raster image 200 to store color values in a specific color format (e.g., RGB, HSV, CIELAB). In one or more embodiments, the raster image 200 includes a digital image generated by a generative neural network (e.g., a text-to-image generative neural network).

Figure 3:
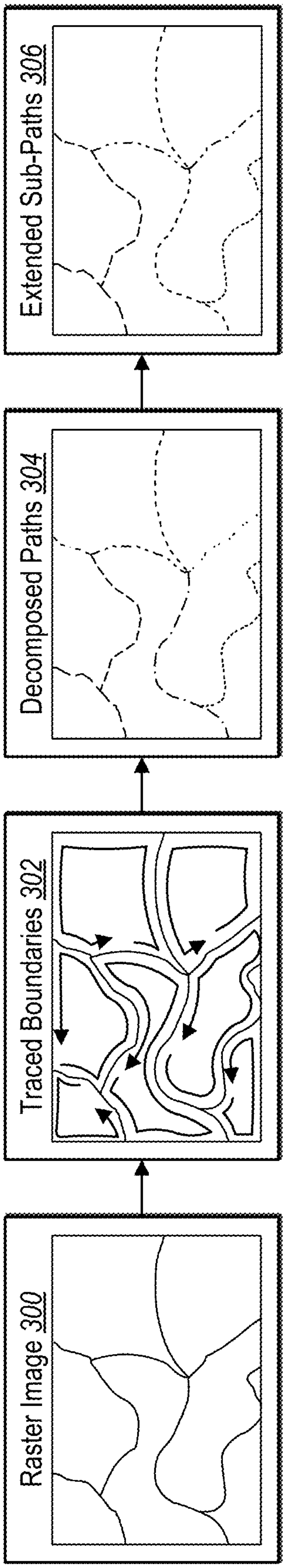
FIG. 3 illustrates a diagram of the path simplification system determining extended sub-paths from polyline boundaries of segmented regions of a raster image in accordance with one or more implementations.

In some embodiments, the path simplification system 102 determines (e.g., accesses) an image segmentation 202 including segmented regions of the raster image 200. In particular, the image segmentation 202 includes a segmentation map or other data storage format that indicates a region to which each pixel of the raster image 200 belongs. For example, in some embodiments, a separate system generates the image segmentation 202 and provides the image segmentation 202 to the path simplification system 102 for performing curve fitting operations according to traced paths in the image segmentation 202. In some embodiments, the image segmentation 202 includes segmentations of pixels based on color values such that adjacent pixels having the same color values (or similar color values within a threshold) or detected as including a gradient correspond to the same segment. FIG. 3 and the corresponding description provide additional detail related to segmenting a raster image.

In one or more embodiments, in response to accessing the image segmentation 202, the path simplification system 102 generates simplified paths 204 to represent boundaries of the segmented regions of the image segmentation 202. For example, the path simplification system 102 simplifies one or more input paths (e.g., pixel-based polylines) along boundaries of the segmented regions by determining line segments connected by a set of vertices to approximate the one or more input paths. In one or more additional embodiments, in connection with simplifying the input paths, the path simplification system 102 generates cornerness scores indicating whether the vertices and connected portions of the input paths likely form corners, arcs, or straight line segments. FIGS. 3-6 and the corresponding description provide additional detail with respect to simplifying paths and detecting shapes of paths.

Figure 4:
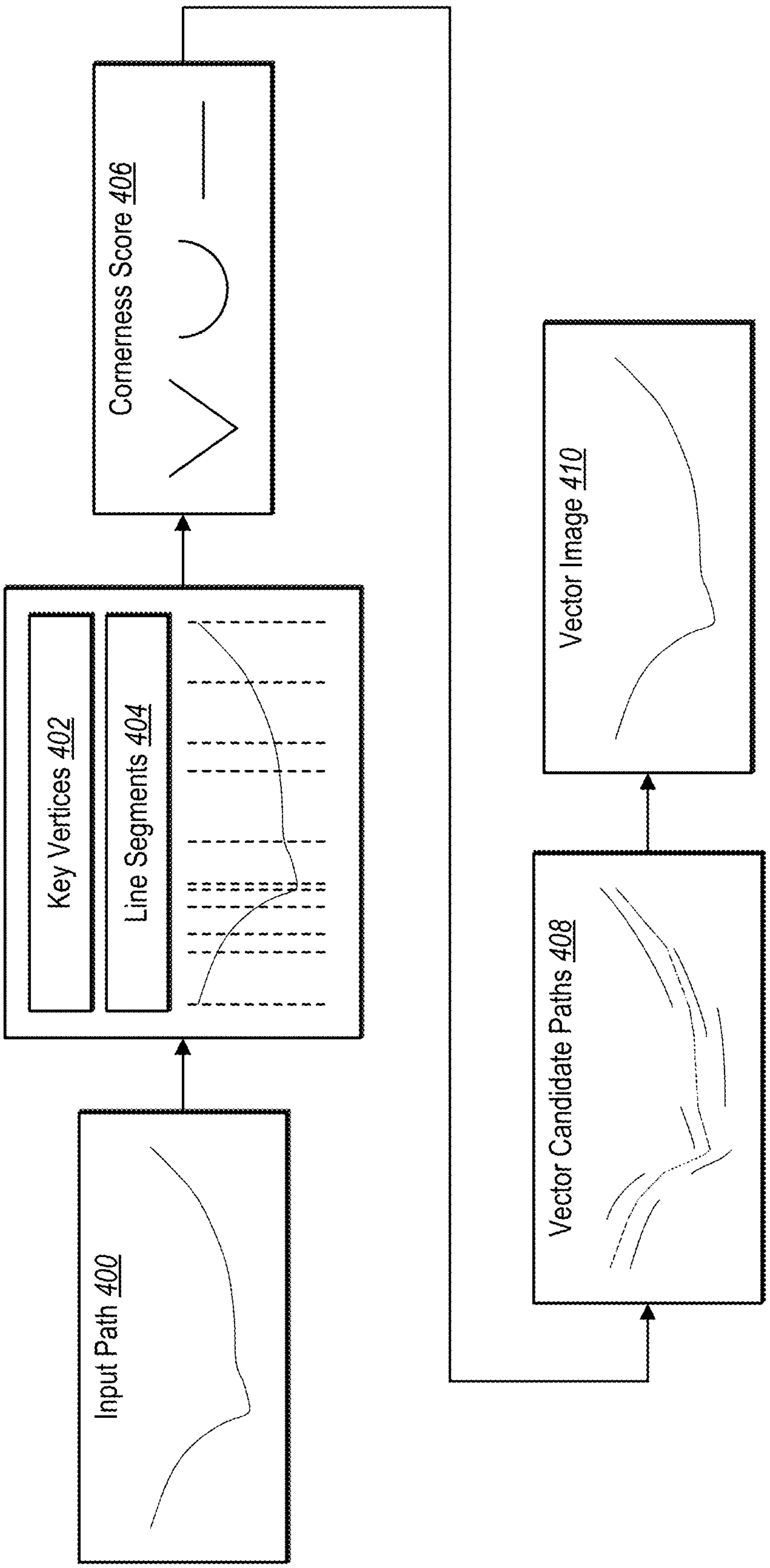
FIG. 4 illustrates a diagram of an overview of the path simplification system generating a vector image from an input path via corner detection and candidate vector path generation in accordance with one or more implementations.
Figure 7:
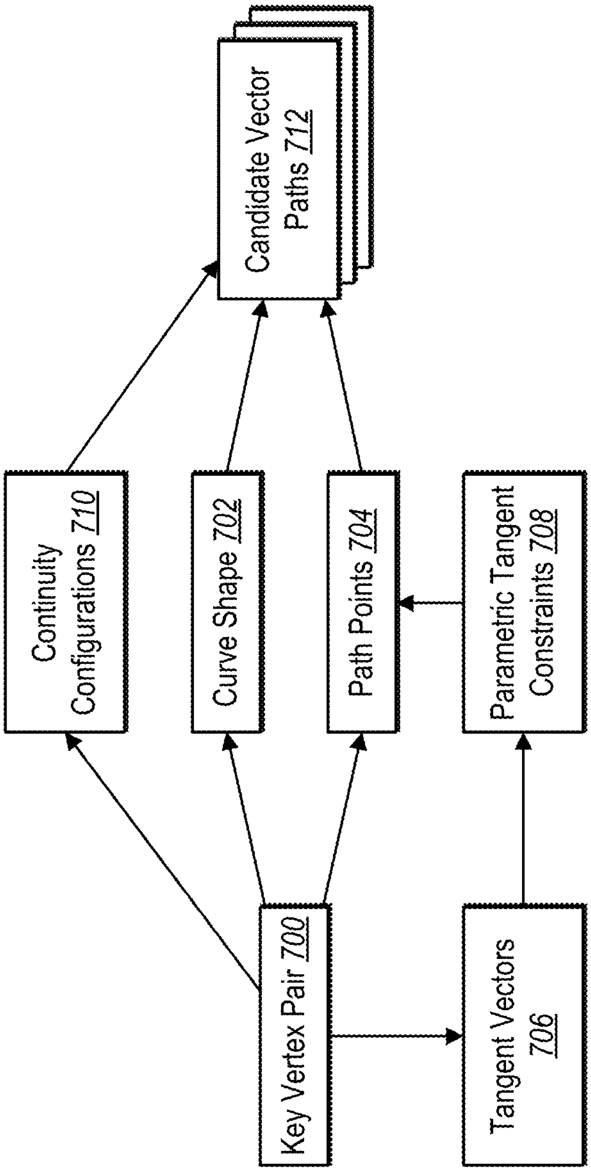
FIG. 7 illustrates a diagram of the path simplification system generating candidate vector paths for a pair of vertices in accordance with one or more implementations.

As illustrated in FIG. 2, in some embodiments, the path simplification system 102 determines fitted vector paths 206 to represent the one or more input paths along the boundaries of the segmented regions. For instance, the path simplification system 102 generates candidate vector paths for each pair of vertices determined with the simplified paths 204. To illustrate, the path simplification system 102 generates the candidate vector paths according to various continuity parameters in connection with tangent vectors associated with the vertices. FIGS. 4 and 7 and the corresponding description provide additional detail with respect to generating candidate vector paths.

Figure 8:
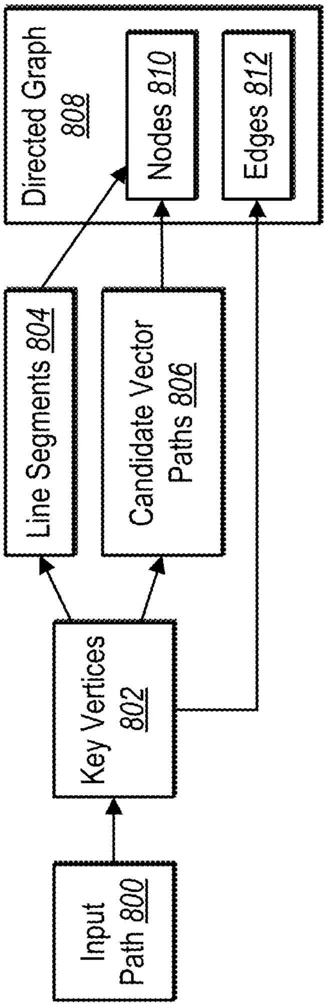
FIG. 8 illustrates a diagram of the path simplification system generating a directed graph that combines line segments and candidate vector paths for a set of vertices in accordance with one or more implementations.
Figure 9:
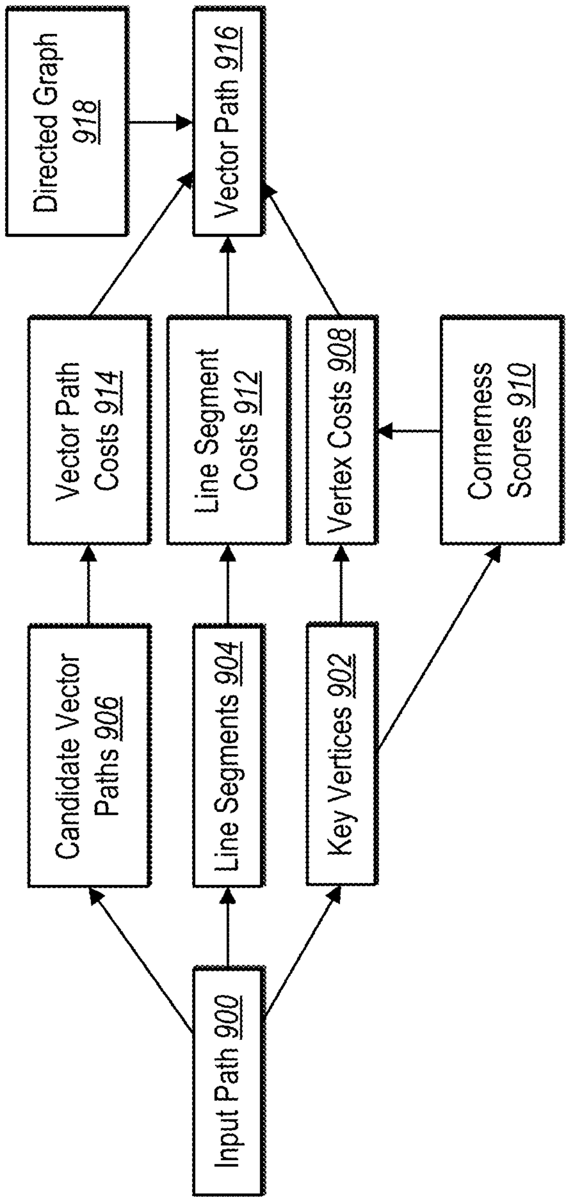
FIG. 9 illustrates a diagram of the path simplification system generating a vector path by utilizing a directed graph to minimize costs associated with line segments and candidate vector paths for a set of vertices in accordance with one or more implementations.

In response to determining the simplified paths 204 and the fitted vector paths 206, the path simplification system 102 generates a vector image 208. In particular, the path simplification system 102 generates vector paths including combinations of line segments and/or candidate vector paths with the set of vertices (or a subset of the set of vertices) that minimize costs for the vector image 208 according to the cornerness scores. For example, the path simplification system 102 generates a directed graph including the line segments and candidate vector paths with the set of vertices indicating relationships between the line segments/candidate vector paths. Additionally, the path simplification system 102 uses the directed graph to determine a path or set of paths that minimize the costs. FIGS. 4, 8, and 9 and the corresponding description provide additional detail related to generating a vector image.

FIG. 3 illustrates an overview diagram of a process in which the path simplification system 102 determines boundaries of a raster image 300 and paths corresponding to the boundaries of segmented regions of the raster image 300. In one or more embodiments, the path simplification system 102 determines traced boundaries 302 corresponding to the boundaries of the segmented regions. For example, the path simplification system 102 traces the boundaries of the segmented regions by generating oriented polylines constructed from pixel-sized edges (or half-edges) of pixels in the segmented regions. In one or more embodiments, the path simplification system 102 utilizes a polyline generation process as described in U.S. patent application Ser. No. 18/756,954, "GENERATING RASTER IMAGE SEGMENTATIONS USING A HALF-EDGE MESH STRUCTURE WITH POLYLINE BOUNDARY TRACING," filed on Jun. 27, 2024, which is herein incorporated by reference in its entirety.

In one or more embodiments, the path simplification system 102 determines decomposed paths 304 from the traced boundaries 302. In particular, because the polylines (in some cases) include pixel-sided edges, the polylines form complex polygons around each region. Accordingly, the path simplification system 102 determines the decomposed paths 304 to replace the polylines with smoother, simplified paths along the boundaries of the segmented regions. For example, the path simplification system 102 replaces the polylines with a set of interconnected paths between junction nodes corresponding to the segmented regions. In one or more embodiments, a junction node includes any vertex that does not have exactly two lines/paths adjacent to the vertex (i.e., four adjacent half-edges). Thus, vertices at the endpoints of paths that are adjacent to only one line/path (e.g., at an edge of an image) or that is adjacent to three or more lines/paths (e.g., at a point where three or more segmented regions meet).

In one or more embodiments, the path simplification system 102 forms the decomposed paths 304 by merging each half-edge in a polyline (or set of adjacent polylines) into a single edge. Additionally, the path simplification system 102 collects edges together into paths that start and end at junction nodes without including junction nodes in their interior. The path simplification system 102 also determines the decomposed paths 304 to include loops that include no junction nodes. By forming the decomposed paths 304, the path simplification system 102 eliminates overlaps and gaps between adjacent regions.

Furthermore, in one or more embodiments, the path simplification system 102 further determines extended sub-paths 306 based on the decomposed paths 304. In some embodiments, the path simplification system 102 further simplifies the decomposed paths 304 by merging paths that are likely to be part of a single, visually coherent smooth curve in the raster image 300. For instance, the path simplification system 102 merges certain paths meeting at a junction node into a single path.

According to one or more embodiments, the path simplification system 102 estimates tangent vectors for each location in the raster image 300 corresponding to a path that meets a junction node. In some embodiments, the path simplification system 102 determines the tangent vectors oriented away from the junction nodes. Additionally, for each junction node, the path simplification system 102 compares tangent vectors for each pair of unmerged paths at junction nodes that have an angle difference closest to 180 degrees and merges the pair of unmerged paths into a single path. In some embodiments, the path simplification system 102 merges unmerged paths only if the angle difference is within a threshold of 180 degrees. The path simplification system 102 repeats the above operations until no more merges are possible. Thus, the path simplification system 102 determines a set of extended sub-paths that have a simplified structure from the original polylines representing the traced boundaries 302 of the segmented regions.

In response to determining the extended sub-paths 306, the path simplification system 102 performs additional path simplification operations to reduce the number of line segments/vector paths and vertices along the boundaries of the segmented regions of the raster image 300. FIGS. 4-9 provide additional details related to these path simplification operations. The path simplification operations described below also preserve junction nodes for stitching the simplified paths back together as a sequence of simplified sub-paths between the junction nodes into a final vector image.

As mentioned, FIG. 4 illustrates a process in which the path simplification system 102 generates a vector image from an input path via various path simplification, corner detection, and vector path generation operations. Specifically, FIG. 4 illustrates that the path simplification system 102 determines an input path 400 to simplify. For example, the path simplification system 102 determines the input path 400 as an extended sub-path as described above with respect to FIG. 3. Accordingly, in some embodiments, the input path 400 includes endpoints that correspond to junction nodes based on an image segmentation of a raster image. Furthermore, in some embodiments, the input path 400 is a densely-sampled polyline (e.g., including many vertices corresponding to edges of pixels between the junction node endpoints).

In one or more embodiments, the path simplification system 102 simplifies the input path 400 to reduce or otherwise approximate the number of vertices and lines to generate key vertices 402 and line segments 404. For example, the path simplification system 102 reconstructs the input path 400 (e.g., path that includes one or more straight or curved portions) with a plurality of straight line paths. In some embodiments, the path simplification system 102 performs automatic corner detection for the key vertices 402 and the line segments 404. Specifically, the path simplification system 102 generates a cornerness score 406 indicating the likelihood that a key vertex and its corresponding portions of the input path 400 form a corner. For example, the path simplification system 102 compares a shape formed by a pair of path portions (e.g., line segments or curves) connected by a key vertex to one of a plurality of shapes, such as a corner shape, an arc shape, and a straight line shape.

Furthermore, in some embodiments, the path simplification system 102 determines candidate vector paths 408 for the key vertices 402. In particular, the path simplification system 102 identifies a pair of key vertices corresponding to the input path 400 and generates one or more candidate vector paths that fit the portion of the input path 400 from a first key vertex to a second key vertex. Accordingly, the path simplification system 102 generates a plurality of candidate vector paths for a plurality of pairs of the key vertices 402 corresponding to different portions of the input path 400. Additionally, the path simplification system 102 generates a vector image 410 from the candidate vector paths 408, the line segments 404, and the key vertices 402. More specifically, as mentioned, the path simplification system 102 reconstructs the input path 400 including or more of the key vertices 402, one or more of the line segments 404, and/or one or more of the candidate vector paths 408.

Figure 5:
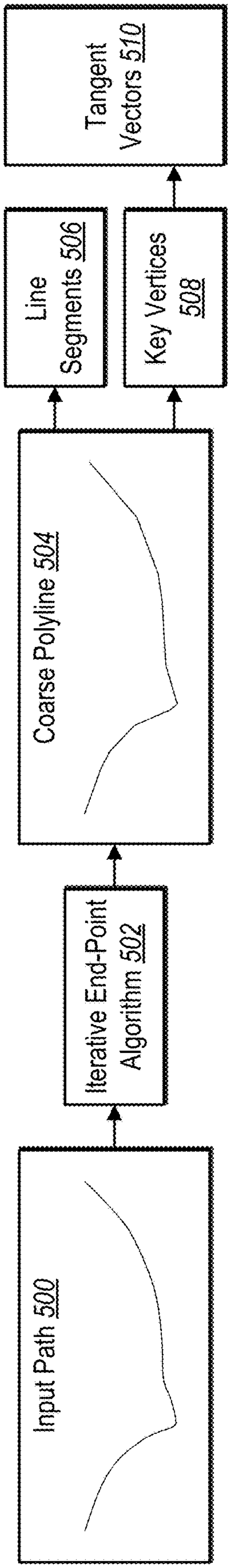
FIG. 5 illustrates a diagram of the path simplification system determining line segments and vertices representing an input path in accordance with one or more implementations.

As mentioned, the path simplification system 102 approximates a path using line segments and vertices. FIG. 5 illustrates an example of the path simplification system 102 approximating an input path 500 utilizing an iterative end-point fit algorithm 502 to generate a coarse polyline 504. To illustrate, the path simplification system 102 utilizes the iterative end-point fit algorithm 502 to approximate the densely-sampled polyline to a less densely-sampled polyline (i.e., the coarse polyline 504). According to one or more embodiments, the path simplification system 102 utilizes the Douglas-Peucker algorithm to approximate coarse polyline 504 in connection with a parameter E (e.g., 1.5) that limits how far the output path differs from the input path 500.

In one or more embodiments, the coarse polyline 504 includes line segments 506 and key vertices 508 that fit the shape of the input path 500. For example, a line segment includes a straight line path in the coarse polyline 504 that begins at a first vertex and ends at a second vertex. Accordingly, a key vertex (e.g., or a vertex in a set of vertices determined for a path) indicates an endpoint of a path in the coarse polyline 504, such that a line segment includes two key vertices as the end points. By utilizing the iterative end-point fit algorithm 502, the path simplification system 102 selects a subset of all possible vertices of the input path 500 for the coarse polyline 504. Thus, each vertex in the coarse polyline 504 is included in the key vertices 508, and each line segment between the key vertices 508 is included in the line segments 506. Furthermore, by determining a set of vertices (i.e., key vertices) corresponding to the coarse polyline 504, the path simplification system 102 utilizes the position information of the vertices for additional operations associated with the input path 500 (e.g., without the line segments 506 of the coarse polyline 504)

In addition to generating the coarse polyline 504, the path simplification system 102 also determines tangent vectors 510 at each of the key vertices 508. In particular, the path simplification system 102 computes a tangent vector at a key vertex with index i by fitting lines to points in the input path 500 (e.g., portions of the input path 500) within a subrange from $i-k$ to $i+k$ for progressively larger values of k until the root-mean-square error between a best-fit line and the points in the subrange exceeds $\epsilon/2$. Thus, the path simplification system 102 determines the tangent vectors 510 at the key vertices 508 based on the corresponding line segments 506 for later use in connection with determining candidate vector paths (e.g., candidate Bezier curves).

Figure 6:
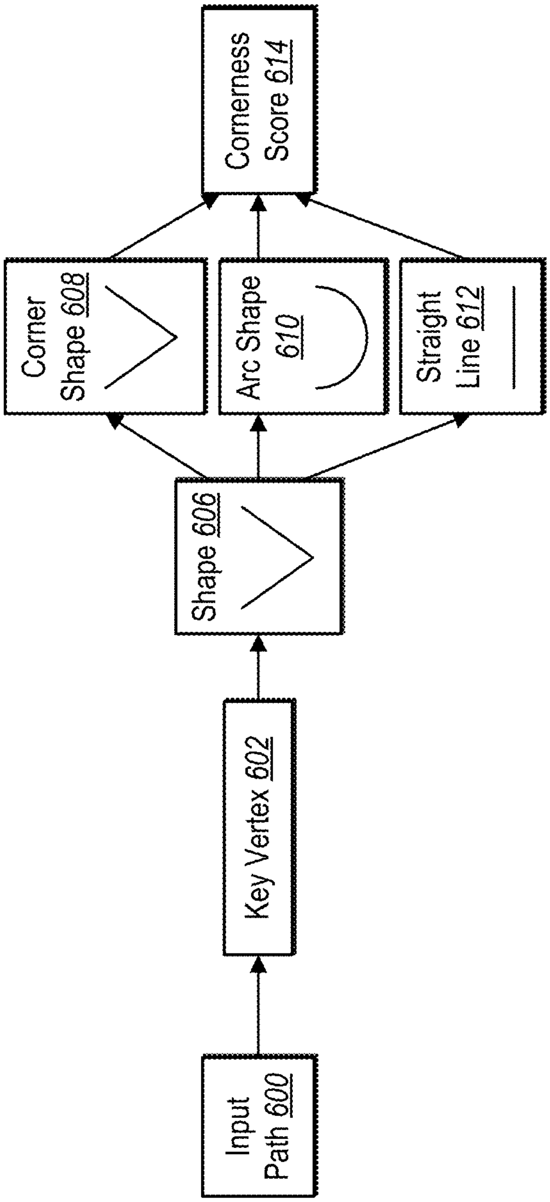
FIG. 6 illustrates a diagram of the path simplification system generating a cornerness score for a vertex in an input path in accordance with one or more implementations.

According to one or more embodiments, the path simplification system 102 determines whether each vertex belongs to a corner by generating cornerness scores for a set of vertices of a path. FIG. 6 illustrates an example of a process in which the path simplification system 102 generates cornerness scores (e.g., confidence scores) indicating the likelihood that a set of vertices of a path belongs to a corner. Specifically, the path simplification system 102 generates the cornerness scores to indicate a comparison of shapes of portions of the path correspond to a specific set of shapes. More specifically, because the input path includes lines and/or curves connected in one or more possible ways, the path simplification system 102 determines whether curves/lines meet smoothly (e.g., in a straight line or curve) or with a sharp transition (e.g., a corner)

As illustrated in FIG. 6, the path simplification system 102 determines, for an input path 600, key vertices in a coarse polyline representing the input path 600. Additionally, in connection with determining the key vertices, the path simplification system 102 determines a shape 606 formed by portions of the input path 600 that connect at a key vertex 602 identified by generating the coarse polyline. For example, the path simplification system 102 identifies the key vertex 602 and two lines or curves from the input path 500 that meet at the key vertex 602 (e.g., excluding end points).

Furthermore, in one or more embodiments, the path simplification system 102 compares a shape 606 formed by the portions of the input path 600 connected at the key vertex 602 to a plurality of different shapes. For instance, the path simplification system 102 compares the shape 606 to at least a corner shape 608 to determine a similarity of the shape 606 to a corner shape 608. In addition, in some embodiments, the path simplification system 102 also compares the shape 606 to one or more additional shapes, such as an arc shape 610 and a straight line shape 612. In some embodiments, the path simplification system 102 compares the shape 606 to only the corner shape 608 and the straight line shape 612. In response to comparing the shape 606 to the different shapes, the path simplification system 102 generates a cornerness score 614 to indicate the likelihood that the shape 606 formed by the portions of the input path 600 fits to one of the shapes.

According to one or more implementations, the path simplification system 102 generates cornerness scores c(v) for each key vertex v indicating how likely the key vertex is to be a corner. In some embodiments, the generated score ranges from −1 for vertices that likely do not belong to a corner to 1 for vertices that likely belong to a corner. Additionally, 0 represents an ambiguous case in which it is unclear whether the vertex likely belongs to a corner.

In one or more embodiments, to determine c(v) at each key vertex, the path simplification system 102 fits three different shapes to the region of the input path 600 around that vertex—a corner shape (including a pair of lines meeting at a corner with a sharp transition), a circular arc, and a straight line. The path simplification system 102 determines the likelihood of the key vertex belonging to a corner in response to determining whether the corner shape, the circular arc, or the straight line is a better fit around the key vertex. For example, the path simplification system 102 fits the corresponding shape to the points in the input path 600 within the subrange from v−k to v+k for progressively larger values of k. The path simplification system 102 terminates the process when the maximum distance between any point in the subrange and the best-fit shape exceeds a threshold $\epsilon$.

In one or more embodiments, the path simplification system 102 determines that a number of points in the subrange to which to fit the shape (e.g., 2k+1) differs for each of the shapes. In particular, L, S, and C represent the number of points used in the subrange to fit a line, arc, and corner shapes, respectively. In response to determining that C is larger than Lor S, the path simplification system 102 determines that the corner shape matches a larger portion of a path near the key vertex than either a circle or a line, indicating that the key vertex is more likely to belong to a corner. In contrast, in response to determining that either L or S is larger than C, the path simplification system 102 determines that the key vertex is more likely to be smooth. An example algorithm for determining a heuristic indicating the cornerness score is as follows:

$$\text{If } L \geq S\text{: } c(v) = -L/\max(L, C)$$

$$\text{If } L < S$$

$$\text{If } S \geq C\text{: } c(v) = f\left(-1 * \left(\frac{S+1}{C+1}\right)\right)$$

$$\text{If } S < C\text{: } c(v) = f\left(\frac{C+1}{S+1}\right)$$

where the function $f$ ensures that the result is within a range from −1 to 1. Additionally, $f$ is defined as:

$$f(x) = \begin{cases} 1 - \dfrac{1}{1 + 5 * (x-1)} & x \geq 0 \\ \dfrac{1}{1 - 5 * (x-1)} - 1 & x < 0 \end{cases}$$

As mentioned, in connection with determining key vertices for a path, the path simplification system 102 determines candidate vector paths (e.g., candidate Bezier curves) that fit the path for pairs of the key vertices. Specifically, as mentioned above, the path simplification system 102 determines straight line segments for each of the key vertex pairs utilizing a first path simplification operation. The path simplification system 102 also determines candidate vector paths for each of the key vertex pairs for possible cases in which portions of the path between the key vertices include curves. FIG. 7 illustrates an example process in which the path simplification system 102 fits one or more candidate vector paths to a key vertex pair.

As illustrated in FIG. 7, the path simplification system 102 determines a key vertex pair 700 from a plurality of key vertices corresponding to an input path. In one or more embodiments, the path simplification system 102 determines the key vertex pair 700 by iterating through a set of vertices (e.g., a vector of vertices) for the path and selecting two vertices. As an example, the path simplification system 102 selects a key vertex pair including a first vertex in the set of vertices and a second vertex adjacent to the first vertex in the set of vertices. Accordingly, the path simplification system 102 selects a subsequent key vertex pair including the first vertex and a third vertex adjacent the second vertex pair in the set of vertices.

In connection with determining the key vertex pair 700, the path simplification system 102 determines a curve shape 702 corresponding to a portion of the path between the vertices in the key vertex pair 700. For example, the curve shape 702 defines/describes the shape of the portion of the path as a set of parameters. Additionally, the path simplification system 102 determines path points 704 for the portion of the path between the vertices of the key vertex pair 700. Specifically, the path points 704 in a curve indicate the closest point on the curve to the input path, which is described by a number, denoted t for each point in the path between the vertices of the key vertex pair 700. As an example, t=0 if the nearest point on the curve is where the curve starts and t=1 if the point is at the end of the curve. Accordingly, t includes a real number between 0 and 1.

In one or more embodiments, the path simplification system 102 fits a cubic Bezier curve approximating the portion of the path between (and including) the two vertices while constraining the Bezier curve to start at the first vertex and end at the second vertex. The path simplification system 102 allows the Bezier curve to bend between the vertices to match the input path. For example, the path simplification system 102 initializes with a default Bezier curve and a default t value for each point in the input path and alternates between two steps until convergence. Specifically, the first step includes fixing the t values (e.g., the path points 704) and solving a quadratic program to find the parameters describing the curve shape 702 subject to the constraint that at any end point where the tangent direction has been specified (e.g., by tangent vectors 706 as previously described in relation to FIG. 5), this tangent must have at least a pre-specified minimum length (parametric tangent constraints 708). Additionally, the second step includes fixing the curve shape 702 and solving for the t values for each point in the input path.

By utilizing the parametric tangent constraints 708 to ensure that the tangent vectors have at least a threshold length, the path simplification system 102 prevents gaps where a section of the resulting Bezier curve passes away from any of the points. In particular, the path simplification system 102 constrains the Bezier curve to match the pre-specified tangent vectors at either or both of the end points (e.g., according to continuity configurations 710) via the parametric tangent constraints 708 including the minimum value (e.g., 0.05 or 0.1 times the estimated length of the Bezier curve). In one or more embodiments, the continuity configurations 710 include constraints on one or both end points of the Bezier curve (e.g., on one or both vertices in the key vertex pair 700) based on whether each of the end points should have $C^0$ or $G^1$ continuity.

Accordingly, in one or more embodiments, the path simplification system 102 generates a plurality of candidate vector paths 712 to the key vertex pair 700. In particular, the path simplification system 102 uses a set of parameters representing the continuity configurations 710 to generate a first candidate vector path (e.g., a first candidate cubic Bezier curve) for key vertices i and j with $C^0$ continuity at each vertex, a second candidate vector path (e.g., a second candidate cubic Bezier curve) with $C^0$ continuity at the first vertex and $G^1$ continuity at the second vertex, a third candidate vector path with $G^1$ continuity at the first vertex and $C^0$ continuity at the second vertex, and a fourth candidate vector path with $G^1$ continuity at each vertex. In some embodiments, the path simplification system 102 discards any candidate vector path for which the maximum distance to one of the original paths exceeds a threshold $\epsilon$. Thus, the path simplification system 102 generates one or more candidate vector paths for each of the key vertex pairs in a set of vertices determined for an input path. Furthermore, by generating one or more candidate vector paths for each separate pair of key vertices, in some embodiments, the path simplification system 102 generates overlapping candidate vector paths across portions of the input path.

In one or more embodiments, the path simplification system 102 generates an overcomplete set of paths/curves including one or more overlapping sub-paths to represent a given path in an image. In one or more embodiments, the path simplification system 102 constructs a path by selecting from a plurality of line segments and a plurality of candidate vector paths based on the shape of the path and locations of key vertices as described above. FIG. 8 illustrates an example of the path simplification system 102 generating a directed graph including nodes and edges representing the possible components from which the path simplification system 102 selects to reconstruct a path.

In particular, as illustrated in FIG. 8, the path simplification system 102 determines an input path 800 to reconstruct. For example, the path simplification system 102 determines the input path 800 between two junction nodes identified in a raster image. Alternatively, the path simplification system 102 determines the input path 800 as a closed loop in the raster image without any junction nodes.

Additionally, in one or more embodiments, the path simplification system 102 determines key vertices 802 in the input path 800, such as during the process of generating line segments 804 to represent the input path 800. In response to, or otherwise in connection with, determining the key vertices 802, the path simplification system 102 determines the line segments 804 and candidate vector paths 806 representing portions of the input path 800 according to pairs of the key vertices 802. By determining a plurality of consecutive line segments connected via the key vertices 802 and one or more candidate vector paths 806 for each pair of key vertices 802, the path simplification system 102 generates an overcomplete set of lines/curves to represent the input path 800.

In one or more embodiments, as illustrated in FIG. 8, the path simplification system 102 generates a directed graph 808 that combines the line segments 804 and the candidate vector paths 806 as possibilities for reconstructing the input path 800. For example, the path simplification system 102 generates the directed graph 808 to include nodes 810 representing the line segments 804 and the candidate vector paths 806. Furthermore, the path simplification system 102 generates the directed graph 808 to include edges 812 representing the key vertices 802. The edges 812 connect the nodes 810 based on the relationships between the key vertices and the line segments 804 or candidate vector paths 806. Additionally, the edges 812 include a directionality indicating relationships between the key vertices 802 and the respective line segments or candidate vector paths. In addition, the path simplification system 102 forms the nodes 810 and edges 812 without cycles according to the directionality of the edges 812, resulting in the graph being acyclic when the input path 800 is acyclic.

In connection with generating a graph representation of line segments, candidate vector paths, and key vertices representing an input path, the path simplification system 102 also determines costs associated with the components of the graph representation for reconstructing the input path. FIG. 9 illustrates a process for generating costs to use in reconstructing a vector path from an input path. Specifically, FIG. 9 illustrates that the path simplification system 102 determines costs for each of the nodes and edges in the graph representation and reconstructs the input path by selecting the optimal path that minimizes the associated costs.

In one or more embodiments, the path simplification system 102 determines an input path 900 corresponding to a boundary, or a portion of a boundary, of a segmented region of a digital image. Additionally, the path simplification system 102 determines key vertices 902, line segments 904, and candidate vector paths 906 as described previously. In connection with determining the key vertices 902, the path simplification system 102 generates cornerness scores 910 indicating the likelihood of the key vertices 902 belonging to a corner (or to another shape such as an arc or a straight line), as previously described.

According to one or more embodiments, the path simplification system 102 generates vertex costs 908 corresponding to the key vertices 902. The path simplification system 102 also generates line segment costs 912 corresponding to the line segments 904. Furthermore, the path simplification system 102 generates vector path costs 914 corresponding to the candidate vector paths 906. The path simplification system 102 uses the costs in connection with the directed graph 918 to select from the key vertices 902, the line segments 904, and the candidate vector paths 906 to reconstruct the input path 900 as a vector path 916. Specifically, the path simplification system 102 traverses the directed graph 918 to generate the vector path 916 by selecting the key vertices, line segments, and/or candidate vector paths that result in minimizing the costs.

In one or more embodiments, as mentioned, the path simplification system 102 uses a cornerness score c for each key vertex to generate the vertex costs 908. Accordingly, the cornerness score results in a pair of costs for each key vertex: $V_{C^0}(v)$ and $V_{G^1}(v)$, representing costs corresponding to $C^0$ and $G^1$ continuities at the key vertex. For example, a pair of Bezier curves/lines meeting at a key vertex v with $C^0$ continuity incurs a cost of $V_{C^0}(v)$, while a pair of Bezier curves/lines meeting with $G^1$ continuity incurs a cost of $V_{G^1}(v)$. In one or more embodiments, the path simplification system 102 determines these costs using the algorithms below.

If $$c(v) > \frac{1}{4},$$

the path simplification system 102 determines that the key vertex belongs to a corner such that:

$$V_{C^0}(v) = \frac{10}{1 + g(c(v), \frac{1}{4})} \quad 1.$$

$$V_{G^1}(v) = 10g(c(v), \frac{1}{4}) \quad 2.$$

If c(v)<0, the path simplification system 102 determines that the key vertex is likely smooth such that:

$$V_{C^0}(v) = 10 + 10g(-c(v), 0) \quad 1.$$

$$V_{G^1}(v) = 0 \quad 2.$$

Otherwise, the path simplification system 102 determines that the key vertex is ambiguous and biases toward $G^1$ continuity for the ambiguous cases.

$$V_{C^0}(v) = 10 \quad 1.$$

$$V_{G^1}(v) = 0 \quad 2.$$

In one or more embodiments, the path simplification system 102 utilizes the function g to map a cornerness score into a cost compatible with the line segment costs 912 and the vector path costs 914. Accordingly, in one or more embodiments in which the candidate vector paths 906 include cubic Bezier curves, the path simplification system 102 uses the function to map the cornerness score to a value between 0 and 1 by using g(−c(v)) when c(v)<0. An example function g is represented as $$g(c, \alpha) = \frac{1}{1 - \min\left(\frac{c - \alpha}{1 - \alpha}, 0.99\right)^2} - 1.$$

Furthermore, in one or more embodiments, the path simplification system 102 determines the line segment costs 912 for the line segments 904 as 3.9+δ·E, where E is the squared error of a fit of a line segment to a portion of an input path and δ is a constant (e.g., $10^{-6}\epsilon$). In one or more embodiments, the path simplification system 102 uses the δ·E term to disambiguate between simplified paths with otherwise equal costs. In one or more embodiments, by generating the line segments 904 between adjacent key vertices, the path simplification system 102 eliminates the need to account for a possibility that a line segment skips over key vertices with non-zero $V_{G^1}$ costs.

According to one or more embodiments, the path simplification system 102 determines the vector path costs 914 for the candidate vector paths 906 including cubic Bezier curves as $4B+\delta\cdot E+\Sigma_v V_{G^1}(v)$. In particular, 4B represents a fixed costs depending on a resulting candidate Bezier curve. To illustrate, for arc and one-inflection point Bezier curves B=1, while for two-inflection point Bezier curves B=2. The path simplification system 102 discards cusp and loop paths. Additionally, as noted above, δ·E disambiguates between simplified paths with otherwise equal costs. Furthermore, $\Sigma_v V_{G^1}(v)$ accounts for cases in which the candidate Bezier curve passes through one or more intermediate key vertices. When a path passes through a key vertex, the path simplification system 102 automatically creates a simplified path with $G^1$ continuity at these vertices, which incurs a cost of $V_{G^1}(v)$ for each intermediate key vertex v through which the candidate Bezier curve passes.

In one or more embodiments, the path simplification system 102 penalizes the candidate vector paths 906 relative to the line segments 904. For example, the path simplification system 102 utilizes a 3.9 constant value for line segments and a 4 constant value (or other weighted values) to prefer selection of a line segment over a curve if possible for simpler reconstruction. Furthermore, the added disambiguation terms allow the path simplification system 102 to select the line segments or candidate vector paths that fit best to the input path.

In some embodiments, the path simplification system 102 generates the vector path 916 by traversing the directed graph 918 to select from the key vertices 902, line segments 904, and candidate vector paths 906 according to the associate costs. For instance, the path simplification system 102 utilizes a dynamic programming algorithm to select a single path of connected line segments and/or candidate vector paths that minimize the sum of vertex costs 908, line segment costs 912, and vector path costs 914. Thus, the resulting path includes any number of line segments, candidate vector paths, and key vertices that result in the lowest summed costs. Because one or more of the costs incorporate the cornerness scores 910 of the key vertices 902, the reconstructed path includes shapes (e.g., corners, arcs, straight lines) that most closely preserve the shapes of the corresponding portions of the input path 900.

Figure 10:
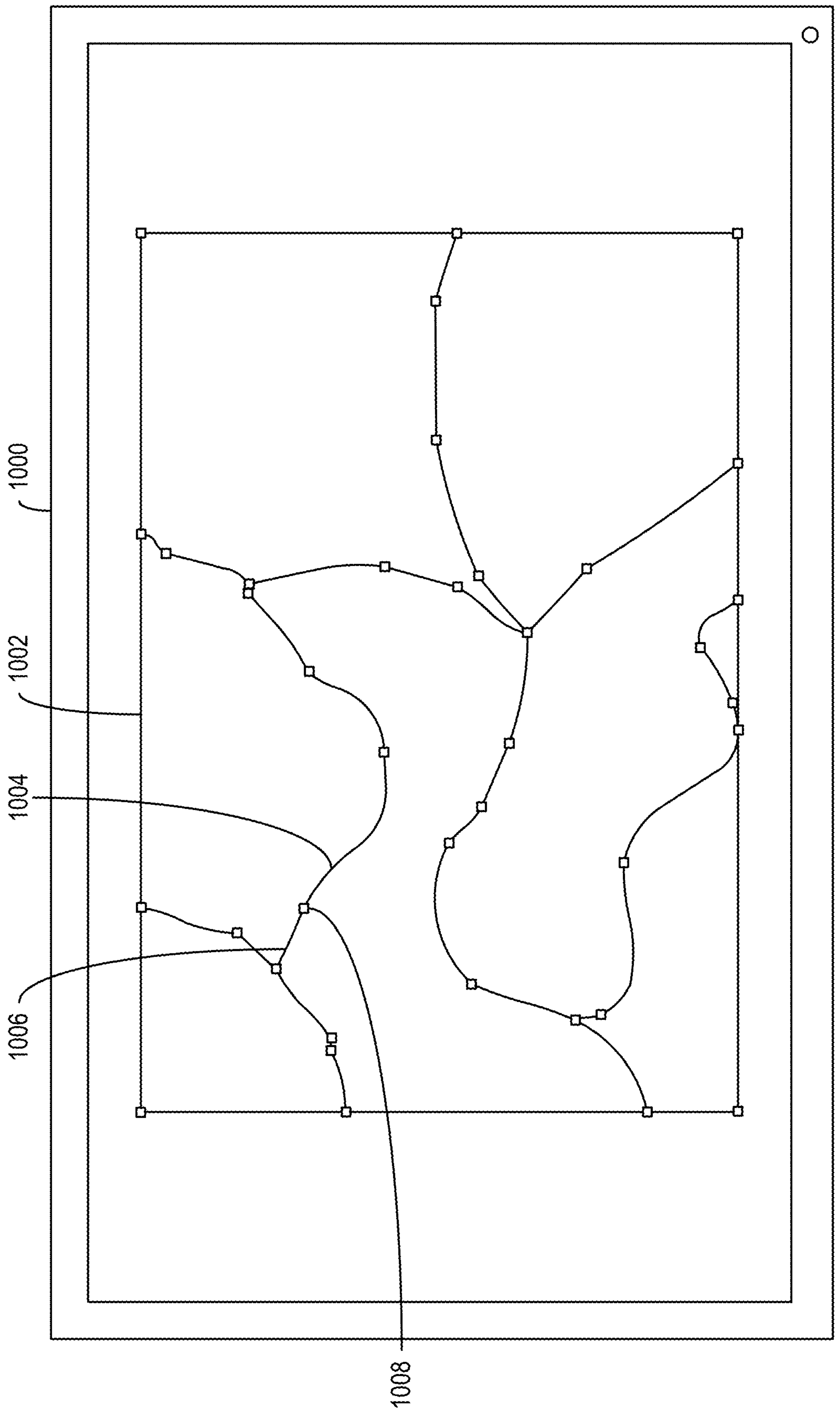
FIG. 10 illustrates an example of a graphical user interface for displaying a vectorized image including simplified paths in accordance with one or more implementations.

FIG. 10 illustrates an example graphical user interface of a client device 1000 displaying a simplified vector image 1002 generated by the path simplification system 102. In particular, as illustrated, the simplified vector image 1002 includes a plurality of line segments and vector paths connected via a set of vertices along boundaries of segmented regions detected in a source raster image. As illustrated, the client device 1000 displays the set of vertices of the simplified vector image 1002 for illustration purposes, though in other embodiments, one or more (or all) of the vertices are hidden).

For example, the simplified vector image 1002 includes a vector curve 1004 corresponding to a first portion of a path and a line segment 1006 corresponding to a second portion of the path adjacent to the first portion. The vector curve 1004 is connected to the line segments 1006 via a vertex 1008. Accordingly, the path simplification system 102 generates the simplified vector image 1002 to include any combination of line segments or vector paths that result in the lowest associated costs. Additionally, by generating the simplified vector image 1002 with a reduced set of vertices and paths relative to the input paths, the path simplification system 102 provides an easily editable version of the image.

Figure 11:
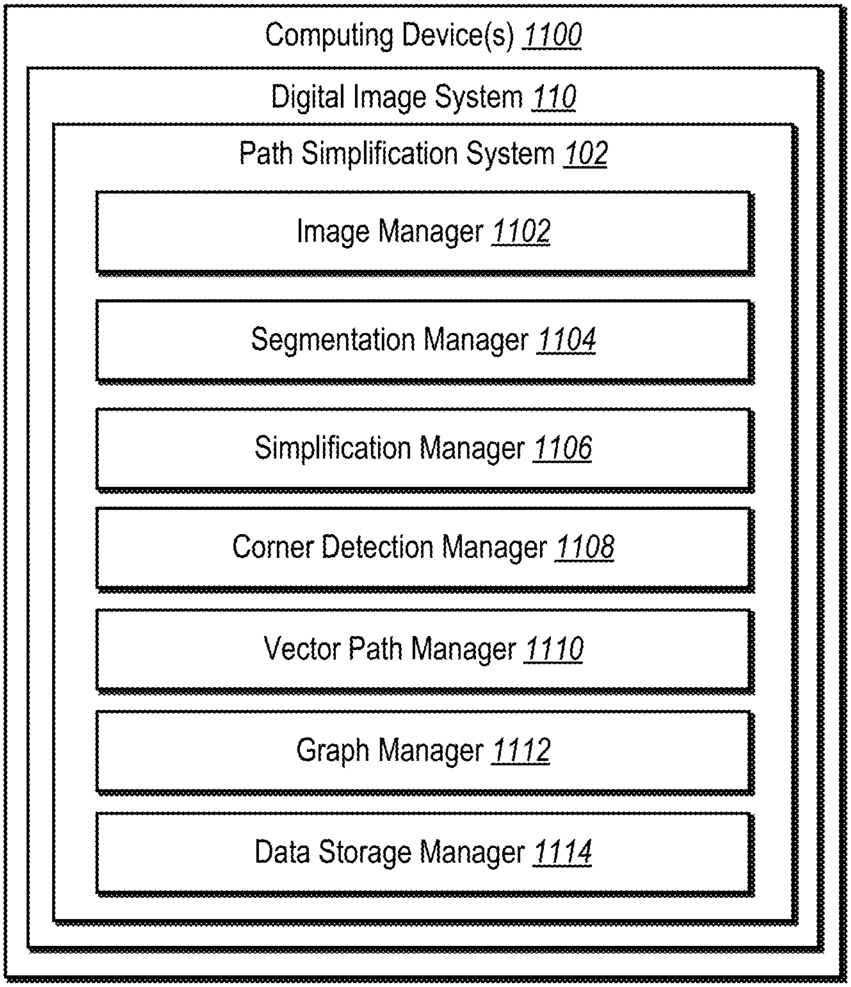
FIG. 11 illustrates a diagram of an example of the path simplification system in accordance with one or more implementations.

FIG. 11 illustrates a detailed schematic diagram of an embodiment of the path simplification system 102 described above. As shown, the path simplification system 102 is implemented in a digital image system 110 on computing device(s) 1100 (e.g., a client device and/or server device as described in FIG. 1, and as further described below in relation to FIG. 13). Additionally, the path simplification system 102 includes, but is not limited to, an image manager 1102, a segmentation manager 1104, a simplification manager 1106, a corner detection manager 1108, a vector path manager 1110, a graph manager 1112, and a data storage manager 1114. In one or more embodiments, the path simplification system 102 is implemented on any number of computing devices. For example, the path simplification system 102, in one or more embodiments, is implemented in a distributed system of server devices for digital image editing. Alternatively, the path simplification system 102 is also implemented within one or more additional systems. For example, the path simplification system 102, in one or more embodiments, is implemented on a single computing device such as a single client device.

In one or more embodiments, each of the components of the path simplification system 102 is in communication with other components using any suitable communication technologies. Additionally, the components of the path simplification system 102 are capable of being in communication with one or more other devices including other computing devices of a user, server devices (e.g., cloud storage devices), licensing servers, or other devices/systems. It will be recognized that although the components of the path simplification system 102 are shown to be separate in FIG. 11, any of the subcomponents may be combined into fewer components, such as into a single component, or divided into more components as may serve a particular implementation. Furthermore, although the components of FIG. 11 are described in connection with the path simplification system 102, at least some of the components for performing operations in conjunction with the path simplification system 102 described herein are implemented on other devices within the environment in other embodiments.

In some embodiments, the components of the path simplification system 102 include software, hardware, or both. For example, the components of the path simplification system 102 include one or more instructions stored on a computer-readable storage medium and executable by processors of one or more computing devices (e.g., the computing device(s) 1100). When executed by the one or more processors, the computer-executable instructions of the path simplification system 102 cause the computing device(s) 1100 to perform the operations described herein. Alternatively, the components of the path simplification system 102 include hardware, such as a special purpose processing device to perform a certain function or group of functions. Additionally, or alternatively, the components of the path simplification system 102 include a combination of computer-executable instructions and hardware.

Furthermore, the components of the path simplification system 102 performing the functions described herein with respect to the path simplification system 102 may, for example, be implemented as part of a stand-alone application, as a module of an application, as a plug-in for applications, as a library function or functions that may be called by other applications, and/or as a cloud-computing model. Thus, the components of the path simplification system 102 may be implemented as part of a stand-alone application on a personal computing device or a mobile device. Alternatively, or additionally, the components of the path simplification system 102 may be implemented in any application that provides digital image editing, including, but not limited to ADOBE® ILLUSTRATOR® and ADOBE® CREATIVE CLOUD® software.

As illustrated, the path simplification system 102 includes an image manager 1102 to manage digital images for image editing operations. In particular, the image manager 1102 accesses digital images (e.g., raster images) for editing based on user inputs providing the digital images or accessing the digital images from a database of images. Additionally, the image manager 1102 manages the display of image content within a digital image application in connection with various image editing tools including image segmentation or vectorization tools.

The path simplification system 102 includes a segmentation manager 1104 to segment digital images and/or to access segmentation of digital images. In particular, the segmentation manager 1104 accesses segmentations of digital images using (or by communicating with) one or more image processes, such as a segmentation neural network. Additionally, the segmentation manager 1104 traces boundaries of segmented regions of a digital image, such as by generating polylines along the boundaries.

The path simplification system 102 includes a simplification manager 1106 to simplify complex paths along boundaries of image segmentations. Specifically, the simplification manager 1106 utilizes an iterative end-point algorithm to determine coarse polylines representing the complex paths. For example, the simplification manager 1106 determines a set of vertices connecting line segments in the coarse polylines.

The path simplification system 102 includes a corner detection manager 1108 to detect corners or other shapes at vertices in a path. For example, the corner detection manager 1108 determines shapes formed by portions of a path at vertices in the path. Additionally, the corner detection manager 1108 compares the shapes formed by the portions of the path to predetermined shapes (e.g., a corner, an arc, a straight line) and generates cornerness scores based on the comparisons.

The path simplification system 102 also includes a vector path manager 1110 to generate candidate vector paths along a path. Specifically, the vector path manager 1110 determines key vertex pairs in a set of vertices of the path and generates one or more candidate vector paths for each key vertex pair. Additionally, the vector path manager 1110 generates the candidate vector paths according to specific continuity configurations in connection with the vertices.

The path simplification system 102 includes a graph manager 1112 to generate a directed graph including possible components for reconstructing a path as a vector path. In particular, the graph manager 1112 generates a directed graph to represent the path by including nodes and edges corresponding to an overfitted set of line segments and candidate vector paths with key vertices for use in reconstructing the path as a vector path. The graph manager 1112 also generates costs associated with the various nodes and edges. In one or more embodiments, the graph manager 1112 generates a vector path by traversing the directed graph and selecting line segments and/or candidate vector paths with a set of corresponding vertices to minimizes the costs.

The path simplification system 102 also includes a data storage manager 1114 (that comprises a non-transitory computer memory) that stores and maintains data associated with segmenting and vectorizing raster images. For example, the data storage manager 1114 stores pixel values, segmented regions, polylines, and other data associated with segmenting raster images. The data storage manager 1114 also stores coarse polylines (e.g., key vertices and line segments), cornerness scores, candidate vector paths, directed graphs, costs associated with the directed graphs, and other data associated with vectorizing raster images.

Figure 12:
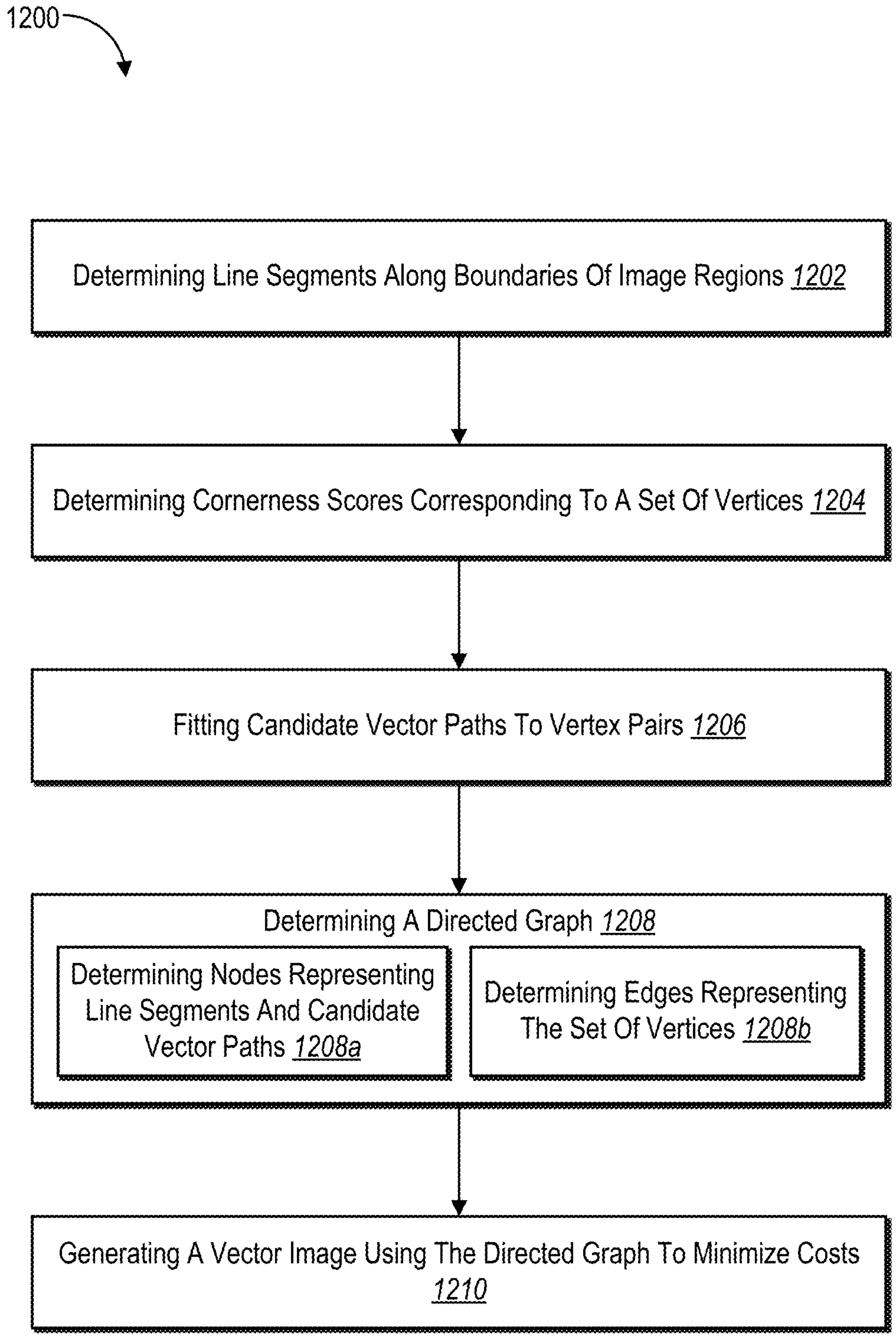
FIG. 12 illustrates a flowchart of a series of acts for vectorizing a raster image using path simplification with corner detection and a directed graph in accordance with one or more implementations.

Turning now to FIG. 12, this figure shows a flowchart of a series of acts 1200 of vectorizing a raster image using path simplification with corner detection and a directed graph. While FIG. 12 illustrates acts according to one embodiment, alternative embodiments may omit, add to, reorder, and/or modify any of the acts shown in FIG. 12. The acts of FIG.

12 are part of a method. Alternatively, a non-transitory computer readable medium comprises instructions, that when executed by one or more processors, cause the one or more processors to perform the acts of FIG. 12. In still further embodiments, a system includes a processor or server configured to perform the acts of FIG. 12.

As shown, the series of acts 1200 includes act 1202 of determining line segments along boundaries of image regions. The series of acts 1200 includes act 1204 of determining cornerness scores corresponding to a set of vertices. Additionally, the series of acts 1200 includes act 1206 of fitting candidate vector paths to vertex pairs. The series of acts 1200 includes act 1208 of determining a directed graph. Act 1208 also includes act 1208*a* of determining nodes representing line segments and candidate vector paths and act 1208*b* of determining edges representing the set of vertices. The series of acts 1200 further includes act 1210 of generating a vector image using the directed graph to minimize costs.

In one or more embodiments, act 1202 involves determining a plurality of line segments from one or more paths along boundaries of segmented regions of a raster image. Act 1204 involves determining cornerness scores corresponding to portions of the one or more paths at a set of vertices by comparing the portions of the one or more paths at the set of vertices to different shapes including at least a corner shape. Act 1206 involves fitting a plurality of candidate vector paths to a plurality of input paths corresponding to pairs of the set of vertices. Act 1208 involves determining a directed graph comprising: nodes representing the plurality of candidate vector paths and the plurality of line segments; and edges between the nodes representing the set of vertices. Act 1210 involves generating, utilizing the directed graph, a vector image comprising a set of vector paths fitted to the boundaries of the segmented regions that minimize costs according to the cornerness scores.

In one or more embodiments, the series of acts 1200 includes determining a plurality of line segments from one or more paths along boundaries of segmented regions of a raster image. The series of acts 1200 further includes determining cornerness scores corresponding to portions of the one or more paths at a set of vertices by comparing the portions at the set of vertices to different shapes including at least a corner shape. The series of acts 1200 also includes fitting a plurality of candidate vector paths to input paths corresponding to pairs of the set of vertices. The series of acts 1200 further includes generating a vector image comprising a set of vector paths fitted to the boundaries of the segmented regions that minimize costs according to the cornerness scores.

In one or more embodiments, the series of acts 1200 includes determining a plurality of line segments and a set of vertices representing one or more paths along boundaries of segmented regions of a raster image. The series of acts 1200 also includes determining cornerness scores for a set of vertices by comparing portions of the one or more paths at the set of vertices to different shapes including at least a corner shape and a straight line segment. Additionally, the series of acts 1200 includes fitting a plurality of candidate vector paths to input paths corresponding to pairs of the set of vertices. The series of acts 1200 further includes determining a directed graph comprising: nodes representing the plurality of candidate vector paths and the plurality of line segments; and edges representing the set of vertices and relationships between the set of vertices and the plurality of candidate vector paths and the plurality of line segments. Additionally, the series of acts 1200 includes generating a vector image comprising a set of vector paths fitted to the boundaries of the segmented regions that minimize costs according to the cornerness scores.

In some embodiments, the series of acts 1200 includes determining a first portion of a path and a second portion of the path that join at a vertex of the set of vertices. The series of acts 1200 includes comparing a shape formed by the first portion of the path and the second portion of the path to the corner shape of the different shapes. The series of acts 1200 further includes generating a cornerness score for the vertex indicating a similarity of the shape formed by the first portion of the path and the second portion of the path to the corner shape.

In one or more embodiments, the series of acts 1200 includes determining the cornerness scores by generating the cornerness score for the vertex further in response to comparing the shape formed by the first portion of the path and the second portion of the path to a straight line shape. Additionally, the series of acts 1200 includes determining the cornerness scores by generating the cornerness score for the vertex further in response to comparing the shape formed by the first portion of the path and the second portion of the path to an arc shape.

In one or more embodiments, the series of acts 1200 includes determining, from the set of vertices, a plurality of pairs of vertices connected by one or more line segments of the plurality of line segments. The series of acts 1200 also includes fitting, based on a pair of vertices of the plurality of pairs of vertices, one or more candidate vector paths approximating an input path from a first vertex to a second vertex in the pair of vertices.

In one or more embodiments, the series of acts 1200 includes determining sets of parameters corresponding to different continuity configurations for the set of vertices. The series of acts 1200 also includes fitting a set of candidate vector paths to the input path from the first vertex to the second vertex in the pair of vertices according to the sets of parameters.

In one or more embodiments, the series of acts 1200 includes generating a directed graph by: determining nodes representing the plurality of candidate vector paths and the plurality of line segments; and determining edges between the nodes representing the set of vertices connecting the plurality of candidate vector paths or the plurality of line segments. The series of acts 1200 includes selecting the set of vector paths from the plurality of candidate vector paths and the plurality of line segments according to the cornerness scores utilizing the directed graph.

In one or more embodiments, the series of acts 1200 also includes determining, for a vertex of the set of vertices, a first cost corresponding to a first parameter of a first continuity configuration for the vertex. The series of acts 1200 further includes determining, for the vertex of the set of vertices, a second cost corresponding to a second parameter of a second continuity configuration for the vertex. The series of acts 1200 includes selecting, from the directed graph, a candidate vector path or a line segment that ends at or passes through the vertex according to the first cost and the second cost.

In one or more embodiments, the series of acts 1200 includes determining one or more junction nodes corresponding to the segmented regions of the raster image. The series of acts 1200 further includes generating a path of the one or more paths as an extended sub-path from a set of polylines along the boundaries of the segmented regions of the raster image by merging portions of the set of polylines according to a tangent vector angle at a junction node of the one or more junction nodes.

In one or more embodiments, the series of acts 1200 includes determining the plurality of line segments by utilizing an iterative end-point fit algorithm to reduce a number of points in a set of polylines corresponding to the boundaries of the segmented regions to the set of vertices with the plurality of line segments having end points corresponding to the set of vertices.

In one or more embodiments, the series of acts 1200 includes determining a tangent vector for a vertex of the set of vertices based on a first portion of a path of the one or more paths and a second portion of the path connected via the vertex. The series of acts 1200 further includes generating a cornerness score for the vertex in response to determining a likelihood that the first portion of the path and the second portion of the path form a corner at the vertex in response to a comparison of the first portion of the path and the second portion of the path to the different shapes.

In one or more embodiments, the series of acts 1200 includes generating a first value by comparing the first portion of the path and the second portion of the path to a corner shape. The series of acts 1200 includes generating a second value by comparing the first portion of the path and the second portion of the path to an arc shape. The series of acts 1200 also includes generating a third value by comparing the first portion of the path and the second portion of the path to a straight line shape. Additionally, the series of acts 1200 includes generating the cornerness score based on the first value, the second value, and the third value.

In one or more embodiments, the series of acts 1200 includes determining sets of parameters corresponding to different continuity configurations at a first vertex and a second vertex corresponding to a portion of an input path. The series of acts 1200 also includes fitting a set of candidate vector paths to the portion of the input path according to the sets of parameters corresponding to the different continuity configurations at the first vertex and the second vertex.

In one or more embodiments, the series of acts 1200 includes generating a separate node for each of the plurality of line segments and the plurality of candidate vector paths. The series of acts 1200 also includes generating the edges between the nodes according to relationships between the set of vertices and the plurality of line segments or the plurality of candidate vector paths.

In one or more embodiments, the series of acts 1200 includes determining parametric tangent constraints for a first vertex and a second vertex in the pair of the set of vertices in relation to a length of the candidate vector path. The series of acts 1200 also includes fitting the candidate vector path with tangent vectors at the first vertex and the second vertex according to the parametric tangent constraints.

In one or more embodiments, the series of acts 1200 includes determining pairs of vertex costs corresponding to the pairs of the set of vertices according to the cornerness scores. The series of acts 1200 includes determining line segment costs corresponding to the plurality of line segments. The series of acts 1200 also includes determining vector path costs corresponding to the plurality of candidate vector paths. The series of acts 1200 further includes selecting, utilizing a dynamic programming algorithm on the directed graph, a path including one or more candidate vector paths or one or more line segments that minimizes the costs.

In one or more embodiments, the series of acts 1200 includes determining a shape formed by a first portion of a path of the one or more paths and a second portion of the path that join at a vertex of the set of vertices. The series of acts 1200 also includes generate a cornerness score for the vertex indicating a similarity of the shape formed by the first portion of the path and the second portion of the path to the different shapes.

In one or more embodiments, the series of acts 1200 includes determining, for the set of vertices, pairs of costs corresponding to different continuity configurations according to the cornerness scores. The series of acts 1200 also includes selecting candidate vector paths of the plurality of candidate vector paths or line segments of the plurality of line segments that minimize the pairs of costs for the set of vertices.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
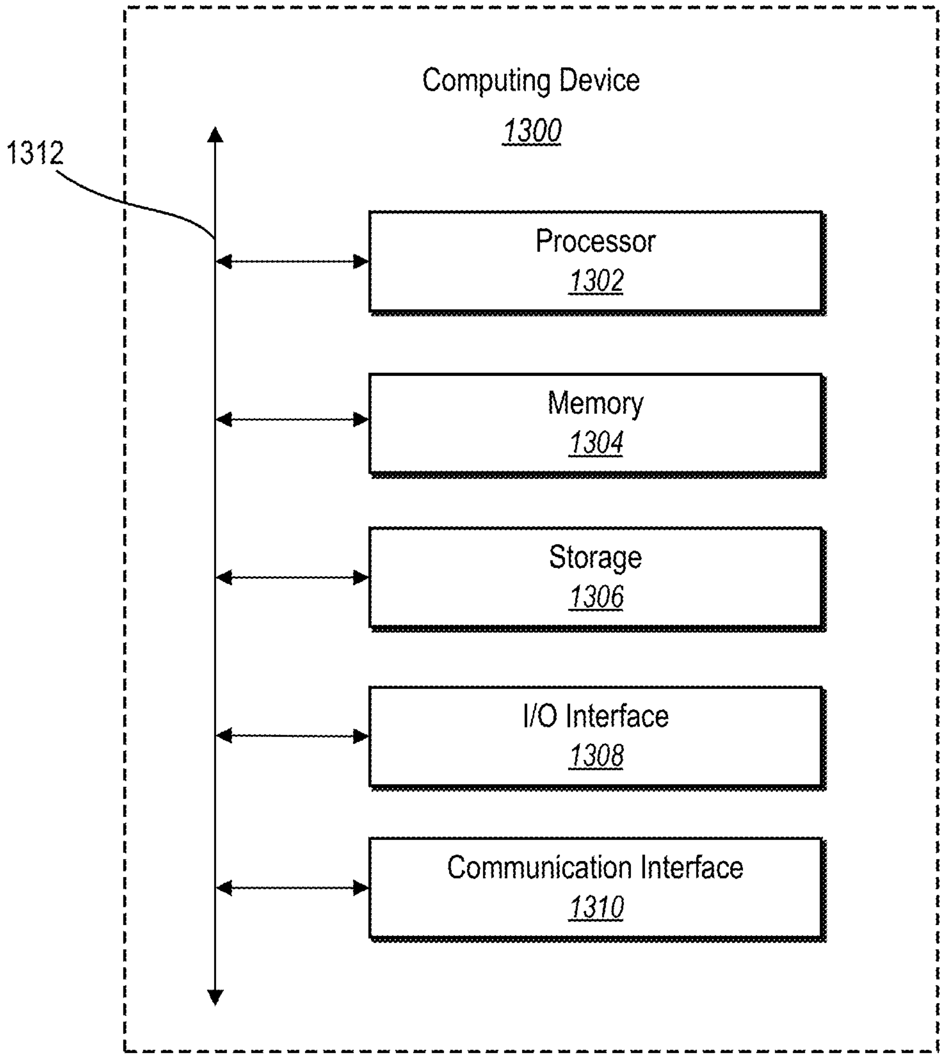
FIG. 13 illustrates a block diagram of an exemplary computing device in accordance with one or more implementations.

FIG. 13 illustrates a block diagram of exemplary computing device 1300 that may be configured to perform one or more of the processes described above. One will appreciate that one or more computing devices such as the computing device 1300 may implement the system(s) of FIG. 1. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. In certain embodiments, the computing device 1300 can include fewer or more components than those shown in FIG. 13. Components of the computing device 1300 shown in FIG. 13 will now be described in additional detail.

In one or more embodiments, the processor 1302 includes hardware for executing instructions, such as those making up a computer program. As an example, and not by way of limitation, to execute instructions for dynamically modifying workflows, the processor 1302 may retrieve (or fetch) the instructions from an internal register, an internal cache, the memory 1304, or the storage device 1306 and decode and execute them. The memory 1304 may be a volatile or non-volatile memory used for storing data, metadata, and programs for execution by the processor(s). The storage device 1306 includes storage, such as a hard disk, flash disk drive, or other digital storage device, for storing data or instructions for performing the methods described herein.

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example, and not by way of limitation, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1310 may facilitate communications with various types of wired or wireless networks. The communication interface 1310 may also facilitate communications using various communication protocols. The communication infrastructure 1312 may also include hardware, software, or both that couples components of the computing device 1300 to each other. For example, the communication interface 1310 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:

determining, by at least one processor, a plurality of line segments connected by a set of vertices from one or more paths along boundaries of segmented regions of a raster image;

determining, by the at least one processor, cornerness scores for the set of vertices by comparing, for a vertex of the the set of vertices, a shape formed by portions of a path connected at the vertex to different shapes including at least a corner shape;

fitting, by the at least one processor, a plurality of candidate vector paths to respective portions of the one or more paths between pairs of vertices of the set of vertices; and generating, by the at least one processor, a vector image comprising a set of vector paths fitted to the boundaries of the segmented regions, the set of vector paths comprising one or more line segments or one or more candidate vector paths selected from the plurality of line segments and the plurality of candidate vector paths to minimize costs according to the cornerness scores, the costs comprising a vertex cost, a line segment cost, and a vector path cost.

2. The computer-implemented method of claim 1, wherein determining the cornerness scores comprises:

determining, for the vertex of the set of vertices, a first portion of the path and a second portion of the path that join at the vertex;

comparing a shape formed by the first portion of the path and the second portion of the path to the corner shape of the different shapes; and generating a cornerness score for the vertex indicating a similarity of the shape formed by the first portion of the path and the second portion of the path to the corner shape.

3. The computer-implemented method of claim 2, wherein determining the cornerness scores comprises generating the cornerness score for the vertex further in response to comparing the shape formed by the first portion of the path and the second portion of the path to a straight line shape.

4. The computer-implemented method of claim 3, wherein determining the cornerness scores comprises generating the cornerness score for the vertex further in response to comparing the shape formed by the first portion of the path and the second portion of the path to an arc shape.

5. The computer-implemented method of claim 1, wherein fitting the plurality of candidate vector paths to the respective portions of the one or more paths between the pairs of vertices comprises:

determining, from the set of vertices, a plurality of pairs of vertices connected by the one or more line segments; and fitting, based on a pair of vertices of the plurality of pairs of vertices, the one or more candidate vector paths approximating a portion of a path of the one or more paths from a first vertex to a second vertex in the pair of vertices.

6. The computer-implemented method of claim 5, wherein fitting the plurality of candidate vector paths to the respective portions of the one or more paths between the pairs of vertices comprises:

determining sets of parameters corresponding to different continuity configurations for the set of vertices; and fitting a set of candidate vector paths to the portion of the path from the first vertex to the second vertex in the pair of vertices according to the sets of parameters.

7. The computer-implemented method of claim 1, wherein generating the vector image comprises:

generating a directed graph by:

determining nodes representing the plurality of candidate vector paths and the plurality of line segments; and determining edges between the nodes representing the set of vertices connecting the plurality of candidate vector paths or the plurality of line segments; and selecting the set of vector paths from the plurality of candidate vector paths and the plurality of line segments according to the cornerness scores utilizing the directed graph.

8. The computer-implemented method of claim 7, further comprising determining the costs according to the cornerness scores by:

determining, for the vertex of the set of vertices, a first vertex cost corresponding to $C^0$ continuity at the vertex based on a cornerness score for the vertex;

determining, for the vertex of the set of vertices, a second vertex cost corresponding to $G^1$ continuity at the vertex based on the cornerness score for the vertex; and selecting, from the directed graph, a candidate vector path or a line segment that ends at or passes through the vertex according to the first vertex cost and the second vertex cost.

9. The computer-implemented method of claim 1, wherein determining the plurality of line segments comprises:

determining one or more junction nodes corresponding to the segmented regions of the raster image; and generating a path of the one or more paths as an extended sub-path from a set of polylines along the boundaries of the segmented regions of the raster image by merging portions of the set of polylines according to a tangent vector angle at a junction node of the one or more junction nodes.

10. A system comprising:

one or more memory devices; and one or more processors configured to cause the system to:

determine a plurality of line segments connected by a set of vertices from one or more paths along boundaries of segmented regions of a raster image;

determine cornerness scores corresponding to vertices of the set of vertices by comparing, for a vertex of the set of vertices, a shape formed by portions of a path connected at the vertex to different shapes including at least a corner shape;

fit a plurality of candidate vector paths to respective portions of the one or more paths between pairs of vertices of the set of vertices;

determine a directed graph comprising:

nodes representing the plurality of candidate vector paths and the plurality of line segments; and edges between the nodes representing the set of vertices connecting the plurality of candidate vector paths or the plurality of line segments; and generate, utilizing the directed graph, a vector image comprising a set of vector paths fitted to the boundaries of the segmented regions, the set of vector paths comprising one or more line segments or one or more candidate vector paths selected from the plurality of line segments and the plurality of candidate vector paths to minimize costs according to the cornerness scores, the costs comprising a vertex cost, a line segment cost, and a vector path cost.

11. The system of claim 10, wherein the one or more processors are configured to cause the system to determine the plurality of line segments by utilizing an iterative end-point fit algorithm to reduce a number of points in a set of polylines corresponding to the boundaries of the segmented regions to the set of vertices with the plurality of line segments having end points corresponding to the set of vertices.

12. The system of claim 10, wherein the one or more processors are configured to cause the system to:

determine a tangent vector for a vertex of the set of vertices based on a first portion of a path of the one or more paths and a second portion of the path connected via the vertex; and generate a cornerness score for the vertex in response to determining a likelihood that the first portion of the path and the second portion of the path form a corner at the vertex in response to a comparison of the first portion of the path and the second portion of the path to the different shapes.

13. The system of claim 12, wherein the one or more processors are configured to cause the system to generate the cornerness score for the vertex by:

generating a first value by comparing the first portion of the path and the second portion of the path to a corner shape;

generating a second value by comparing the first portion of the path and the second portion of the path to an arc shape;

generating a third value by comparing the first portion of the path and the second portion of the path to a straight line shape; and generating the cornerness score based on the first value, the second value, and the third value.

14. The system of claim 10, wherein the one or more processors are configured to cause the system to fit the plurality of candidate vector paths to the respective portions of the one or more paths between the pairs of vertices of the set of vertices by:

determining sets of parameters corresponding to different continuity configurations at a first vertex and a second vertex corresponding to a portion of path; and fitting a set of candidate vector paths to the portion of the path according to the sets of parameters corresponding to the different continuity configurations at the first vertex and the second vertex.

15. The system of claim 10, wherein the one or more processors are configured to cause the system to determine the directed graph by:

generating a separate node for each of the plurality of line segments and the plurality of candidate vector paths; and generating the edges between the nodes according to relationships between the set of vertices and the plurality of line segments or the plurality of candidate vector paths.

16. The system of claim 10, wherein the one or more processors are configured to cause the system to fit a candidate vector path to a portion of a path between a pair of vertices of the set of vertices by:

determining parametric tangent constraints for a first vertex and a second vertex in the pair of vertices in relation to a length of the candidate vector path; and fitting the candidate vector path with tangent vectors at the first vertex and the second vertex according to the parametric tangent constraints.

17. The system of claim 10, wherein the one or more processors are configured to cause the system to generate the vector image by:

determining, for vertices of the set of vertices, pairs of vertex costs according to the cornerness scores;

determining line segment costs corresponding to the plurality of line segments;

determining vector path costs corresponding to the plurality of candidate vector paths; and selecting, utilizing a dynamic programming algorithm on the directed graph, a path including one or more candidate vector paths or one or more line segments that minimizes a sum of the vertex costs, the line segment costs, and the vector path costs.

18. A non-transitory computer readable medium storing instructions thereon that, when executed by at least one processor, cause the at least one processor to perform operations comprising:

determining a plurality of line segments and a set of vertices representing one or more paths along boundaries of segmented regions of a raster image;

determining cornerness scores for the set of vertices by comparing, for a vertex of the set of vertices, a shape formed by portions of a path connected at the vertex to different shapes including at least a corner shape and a straight line shape;

fitting a plurality of candidate vector paths to respective portions of the one or more paths between pairs of vertices of the set of vertices;

determining a directed graph comprising:

nodes representing the plurality of candidate vector paths and the plurality of line segments; and edges representing the set of vertices and relationships between the set of vertices and the plurality of candidate vector paths and the plurality of line segments; and generating a vector image comprising a set of vector paths fitted to the boundaries of the segmented regions, the set of vector paths comprising one or more line segments or one or more candidate vector paths selected from the plurality of line segments and the plurality of candidate vector paths to minimize costs according to the cornerness scores, the costs comprising a vertex cost, a line segment cost, and a vector path cost.

19. The non-transitory computer readable medium of claim 18, wherein determining the cornerness scores comprises:

determining a shape formed by a first portion of a path of the one or more paths and a second portion of the path that join at a vertex of the set of vertices; and generating a cornerness score for the vertex indicating a similarity of the shape formed by the first portion of the path and the second portion of the path to the different shapes.

20. The non-transitory computer readable medium of claim 18, wherein generating the vector image comprises:

determining, for the set of vertices, pairs of vertex costs according to the cornerness scores, a pair of vertex costs comprising a first vertex cost corresponding to $C^0$ continuity at a vertex of the set of vertices and a second vertex cost corresponding to $G^1$ continuity at the vertex; and selecting candidate vector paths of the plurality of candidate vector paths or line segments of the plurality of line segments that minimize the pairs of vertex costs for the set of vertices.

* * * * *